UNITED STATES PATENT OFFICE.

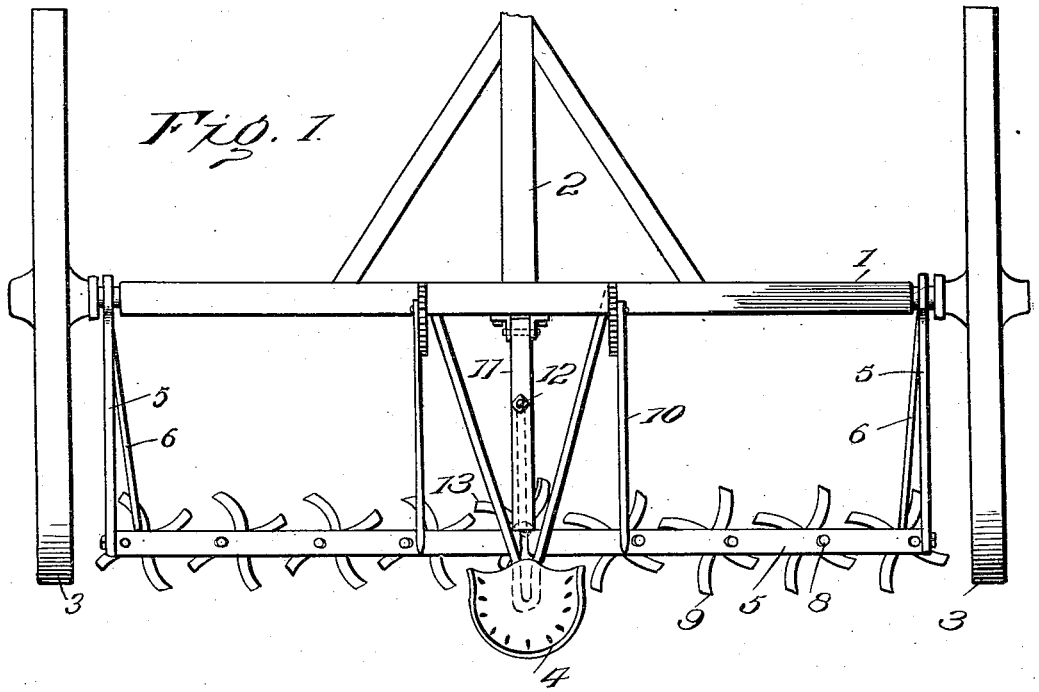
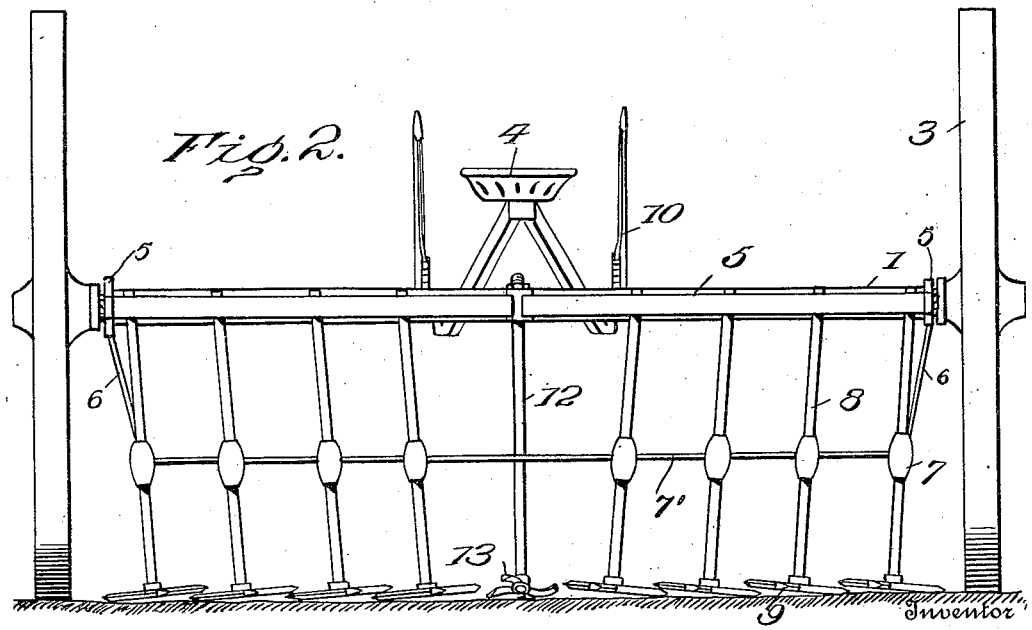

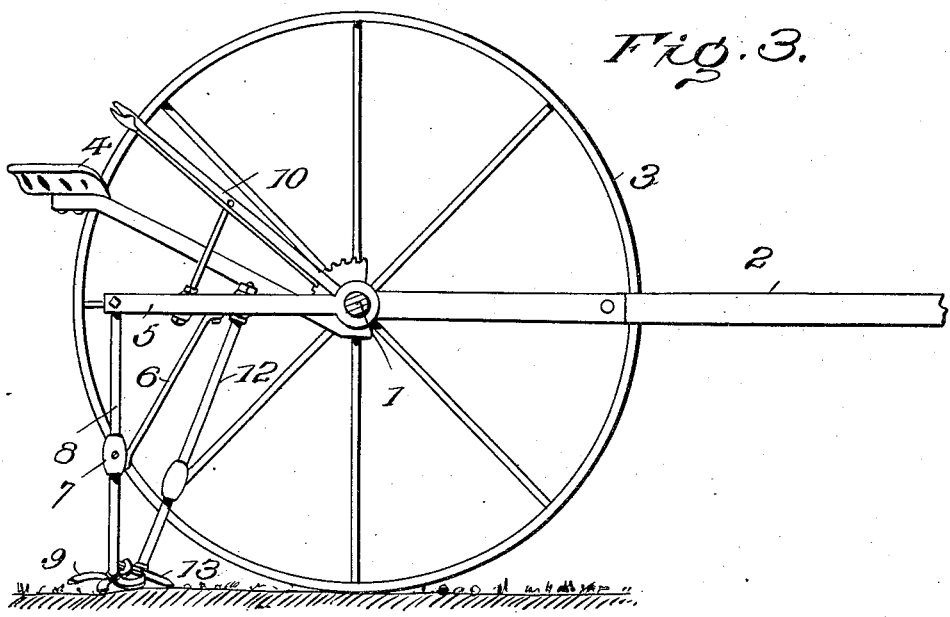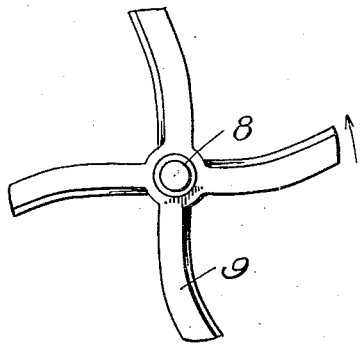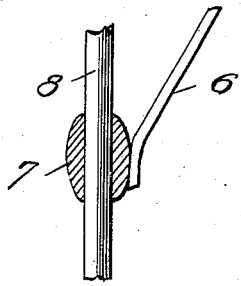

PERRY O. CASWELL, OF SILVERTON, OREGON, ASSIGNOR OF ONE-FOURTH TO LEWIS O. CASWELL, OF SILVERTON, OREGON.

WEED-CUTTER.

1,011,917.         Specification of Letters Patent.         Patented Dec. 19, 1911.

Application filed April 18, 1911. Serial No. 621,854.

*To all whom it may concern:*

Be it known that I, PERRY O. CASWELL, citizen of the United States, residing at Silverton, in the county of Marion and State of Oregon, have invented certain new and useful Improvements in Weed-Cutters, of which the following is a specification.

This invention relates to weed cutters, and has for its object to provide an animal drawn machine having a series of cutters journaled thereon and so disposed with relation to the ground that the contact of the blades of the cutters with the ground will automatically turn the cutters. Each set of blades is located in an inclined position with relation to the surface of the ground and the blades of one set when in elevated position slightly overlap the depressed blades of the next adjacent set. This is preserved throughout the entire gang of cutters so that the said blades may operate upon the weeds over the entire surface of the ground over which the machine is drawn.

Another object of the invention is to dispose the axes of the cutters at one side of the machine at an equal but opposite angle to the axes of the cutters at the other side of the machine, in order that the machine will not have a tendency to side draft as it is drawn over the ground. The opposite disposition of the axes of the cutters will be such as to balance the tendency to lateral movement, whereby the machine may be readily drawn in a straightforward direction. Therefore the machine is provided with two gangs of cutters located one at each side of the frame, and in order to operate over the ground at the space between the two gangs an additional cutter is provided which is located midway between the ends of the frame of the machine, but which has its axis disposed in an incline in the line of draft of the machine and not to one side as is the case of the cutters located at the side portions of the frame of the machine.

For a full understanding of the invention reference is to be had to the following description and accompanying drawings, in which:

Figure 1 is a top plan view of the cutter; Fig. 2 is a rear elevation of the same; Fig. 3 is a side elevation of the same with part in section; Fig. 4 is a plan view of one of the sets of cutter blades; and Fig. 5 is a detail sectional view of a shaft bearing used upon the cutter and attached parts.

Corresponding and like parts are referred to in the following description and indicated in all the views of the accompanying drawings by the same reference characters.

The machine includes an axle 1, to the intermediate portion of which is attached a draft tongue 2. Wheels 3 are journaled at the ends of the axle 1. An operator's seat 4 is mounted upon the intermediate portion of the axle and extends rearwardly therefrom. Frame sections 5 are hingedly connected with the axle 1 at the end portions thereof, and braces 6 extend downwardly and rearwardly from the forward portions of the said frame sections. The terminal members of a set of bearings are carried at the lower ends of the braces 6 and shafts 8 are journaled in the said bearings. The adjacent bearing members are connected together by rod sections 7' which support and brace the same. Each shaft 8 is provided at its lower end with a set of radially disposed fixed cutting blades 9. The shafts 8 upon one frame section and inclined at an equal angle to the shafts 8 upon the other frame section, so that the blades 9 carried by the shafts do not lie in horizontal planes but are in inclined planes. Therefore the said blades, when they are at one side of the shaft by which they are carried, will penetrate deeper into the soil than the blades at the other side and this will cause the set of blades to rotate, and the blades that are moving above the top of the soil will cut the weeds located there. The sets of blades of both gangs are in such close proximity to each other that the elevated blades of one set overlap the depressed blades of the next adjacent set, consequently the blades will operate over the entire surface of the ground over which the machine is moved.

Levers 10 are fulcrumed upon the axle 1 and are operatively connected with the frame sections 5, and serve as means whereby the said sections may be raised or lowered and held in adjusted position. An arm 11 extends rearwardly from the intermediate portion of the axle 1 and a shaft 12 is journaled in the said arm. The shaft 12 is in an inclined position, but is located in the line of draft of the machine. The lower end of the said shaft is rearwardly disposed with relation to the upper end. This shaft carries a set of radially disposed blades 13, and consequently the said blades when they are in front of the shaft are projected deeper into the soil than the blades behind the shaft. Therefore as the machine is drawn along, the set of blades 13 is rotated about the axis of the shaft 12. This set of blades is located in advance of the gangs of blades at the opposite end portions of the machine and the blades 13 are adapted to operate over the soil which would be located under the space between the inner ends of the gangs of blades at the opposite ends of the machine. Therefore it will be seen that notwithstanding the fact that each set of blades has an angular disposition with relation to the surface of the ground, the blades are so positioned and arranged that they will operate over the entire area of the ground embraced within the outermost sets of blades carried by the machine, and the machine therefore will not permit weeds or vegetable growth to escape the chopping action of the knives.

Having thus described the invention, what is claimed as new is:

A weed cutter, comprising a wheel mounted frame, gangs of shafts located at the opposite end portions thereof, said shafts being inclined, the axes of the shafts at one side of the frame being at equal angles to the axes of the shafts at the other side but inclined in opposite directions, blades carried by the shafts, the elevated blades of each gang overlapping the depressed blades of the next adjacent set of blades in the same gang, and a shaft journaled between the gangs and having its axis inclined but in the line of draft of the machine, and a set of blades mounted upon the last mentioned shaft and arranged to operate in advance of the inner portions of the innermost sets of blades of the said gangs.

In testimony whereof, I affix my signature in presence of two witnesses.

PERRY O. CASWELL.

Witnesses:
 LEWIS O. CASWELL,
 C. E. ROSS.

---

Copies of this patent may be obtained for five cents each, by addressing the "Commissioner of Patents, Washington, D. C."